Aug. 14, 1945.　　　G. M. HOWARD　　　2,382,634
CARRIER BELT
Filed Sept. 11, 1942

INVENTOR.
George M. Howard
BY
Murray, Sackhoff & Paddock
ATT'YS

Patented Aug. 14, 1945

2,382,634

UNITED STATES PATENT OFFICE 2,382,634

CARRIER BELT

George M. Howard, Cincinnati, Ohio, assignor to Howard Engineering & Manufacturing Company, Cincinnati, Ohio, a corporation of Ohio Application September 11, 1942, Serial No. 458,027

3 Claims. (Cl. 198—193)

This invention relates to a carrier belt of the link or open type and which is adapted for a variety of uses in which articles and commodities in the course of manufacture or processing are moved on the belt from one stage to another of the work.

An object of the invention is to provide a belt of this kind which is adjustable as to the openings between the links so that, if small articles are being carried on the belt, the openings may be reduced to the necessary degree to preclude falling of the objects through the belt.

Another object is to provide such a belt in which the adjustment referred to may be accomplished in a minimum of time.

Another object is the provision of a belt of this character in which the means for selectively adjusting the openings in the belt may be produced simply and at low cost and which means may be applied to existing types of belts.

These and other objects are attained by the means described herein and illustrated in the accompanying drawing, in which.

Figure 1:
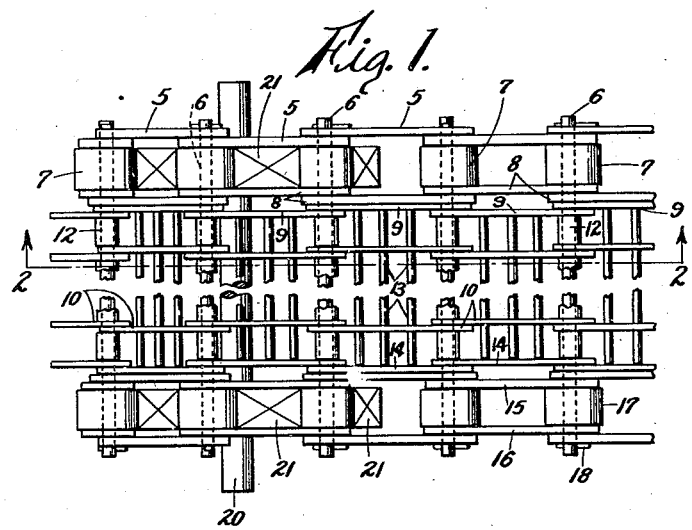
Fig. 1 is a plan view of a section of the belt of this invention shown in position on a conventional sprocket, portions of the belt being broken away.

In greater detail and with reference to the drawing:

The belt generally is formed with links disposed vertically or edgewise relative to the plane of the belt. The parts of the belt shown are articulated throughout and the belt is adapted to be built up from one side to the other. Described according to such procedure, the belt comprises relatively heavy side plates or links 5 of elongated rectangular outline. These are provided adjacent their ends with perforations adapted to receive main belt rods 6, which rods are to extend clear across the width of the completed belt. These rods next have placed thereon the rollers 7 and thereafter inner side plates 8 similar to the plates 5 are placed on the rods 6.

Figure 2:
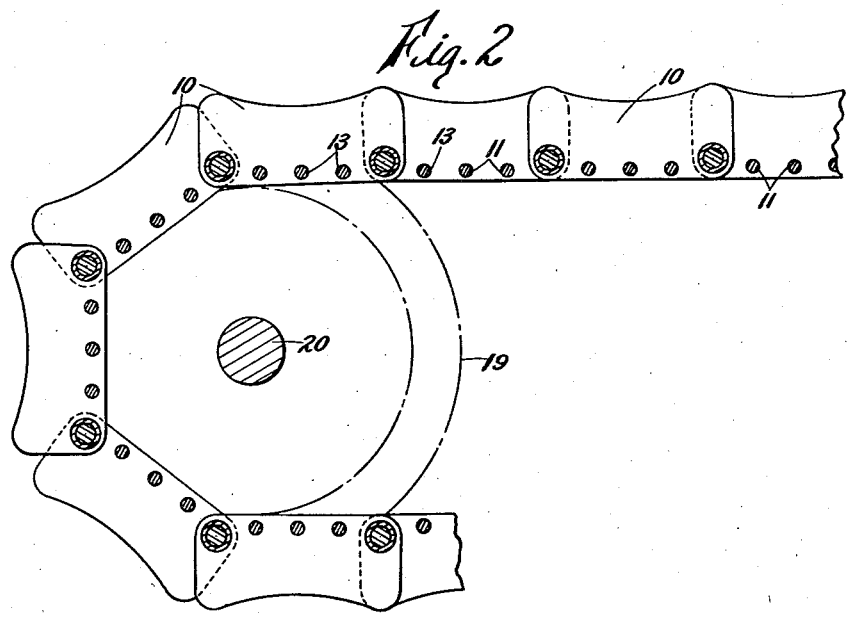
Fig. 2 is an enlarged cross-sectional view on the line 2—2 of Fig. 1.

The next step in forming the belt of this invention is the placing in position on the rods 6 of stop plates 9. There are now placed on the supporting rods 6 the links 10 seen clearly in Fig. 2. It will be seen that these links are provided with end apertures similarly to the plates previously described for receiving the belt rods 6 and, in addition, intermediate the length of each of these plates, one or more perforations 11 are formed, three of such perforations being shown herein.

After the first set of links 10 has been positioned longitudinally of the belt, a set of spacing tubes or spacers 12 is placed on the rods 6. Then another longitudinally extending set of the apertured links 10 is slipped into place on said rods, followed by another set of spacers 12, and so on in similar manner, until the required number of the perforate links 10 has been positioned.

The present invention provides next for inserting one or more auxiliary or closure rods 13 through the perforations 11 provided in the links 10. The number of rods 13 employed depends upon the extent to which it is desired to reduce the openings between the belt links. As shown herein, all three perforations 11 have rods 13 inserted therethrough. The initially inserted ends of rods 13 are advanced to the first-formed side of the belt where said ends contact the stop plates 9. After all of the rods 13 have been placed, stop plates 14, identical with the stop plates 9, are slipped onto the belt rods 6. Following this, the belt is completed by adding thereto the side plates 15 and 16 with the rollers 17 therebetween. The extreme ends of the belt rods 6 have suitable means such as cotter pins 18 associated therewith for holding the parts of the belt together.

It will be understood that the belt so formed is adapted to be operated over a sprocket, shown conventionally at 19 (Fig. 2), the sprocket being mounted on a shaft 20 and being formed with teeth 21, shown conventionally in Fig. 1, which teeth are adapted to project between the rollers 7 and 17 on the two sides of the belt.

When it is desired to reduce or increase the number of closure rods 13 employed, it is merely necessary to remove the side plates, rollers and stop plates on one side of the belt, whereupon the said rods may be slipped out of place, or inserted, as the case may be.

By the means of this invention belt openings may be adjusted as desired so that one belt is sufficient for serving a wide variety of uses, whether the articles to be carried on the belt are of large or small dimensions. The belt may be made wider or narrower by the use of longer or shorter belt rods 6 and closure rods 13, and by increasing or decreasing the number of links 10 and their associated spacers, the assembly and relationship of parts being always the same. The adjustments described may be performed by ordinary workmanship and in a minimum of time.

Modifications will suggest themselves upon consideration of the means herein disclosed but these are believed to be comprised within the spirit and scope of the invention.

What is claimed is:

1. A carrier belt comprising two sprocket engaging chains disposed in parallel, spaced relationship and each having overlapping side links, rollers positioned between the side links in transverse alignment with the overlapping portions therefor, and common articulating rods for the chains and rollers, a carrier portion between the said chains having a plurality of links disposed edgewise relative to the plane of the belt, transversely aligned apertures formed in the links for receiving the said rods, rod encircling sleeves spacing the links laterally, each carrier link having formed therethrough a plurality of apertures, the apertures in transversely adjacent links being in alignment, and a number of supporting rods inserted in said aligned apertures, the number of supporting rods so employed being determined by the size of the articles to be supported by the carrier portion of the belt.

2. A carrier belt comprising two sprocket engaging chains disposed in parallel, spaced relationship and each having longitudinal rows of overlapping side links, rollers positioned between the rows of side links in transverse alignment with the overlapping portions therefor, transversely aligned holes formed through the overlapping portions of the side links and rollers, and common articulating rods passing through the said holes in the links and rollers, a carrier portion between the said chains having a number of spaced, longitudinal rows of links, disposed edgewise relative to the plane of the belt, with their ends in overlapping relationship, transversely aligned apertures formed in the overlapping portions of the links for receiving the said articulating rods, rod encircling sleeves spacing the rows of links laterally, each carrier link having formed therethrough a plurality of longitudinally spaced apertures, the apertures in transversely adjacent links being in transverse alignment, and a number of supporting rods held in said aligned apertures, the bodies of said supporting rods lying in the horizontal extension lines of the chains, the number of supporting rods so employed being determined by the size of the articles to be supported by the carrier portion of the belt.

3. A carrier belt comprising two sprocket engaging chains disposed in parallel, spaced relationship and each having longitudinal rows of overlapping side links, rollers positioned between the rows of side links in transverse alignment with the overlapping portions therefor, transversely aligned holes formed through the overlapping portions of the side links and rollers, and common articulating rods passing through the said holes in the links and rollers, a carrier portion between the said chains having a number of spaced, longitudinal rows of links, disposed edgewise relative to the plane of the belt, with their ends in overlapping relationship, transversely aligned apertures formed in the overlapping portions of the links for receiving the said articulating rods, rod encircling sleeves spacing the rows of links laterally, each carrier link having formed therethrough a plurality of longitudinally spaced apertures, the apertures in transversely adjacent links being in transverse alignment, and a number of supporting rods held in said aligned apertures, a longitudinal row of imperforate stop plates interposed between the chains and the carrier portion of the belt, and said stop plates having aligned apertures formed therein for receiving the articulating rods, the bodies of said supporting rods lying in the horizontal extension lines of the stop plates, the number of supporting rods so employed being determined by the size of the articles to be supported by the carrier portion of the belt.

GEORGE M. HOWARD.